Figure 1:
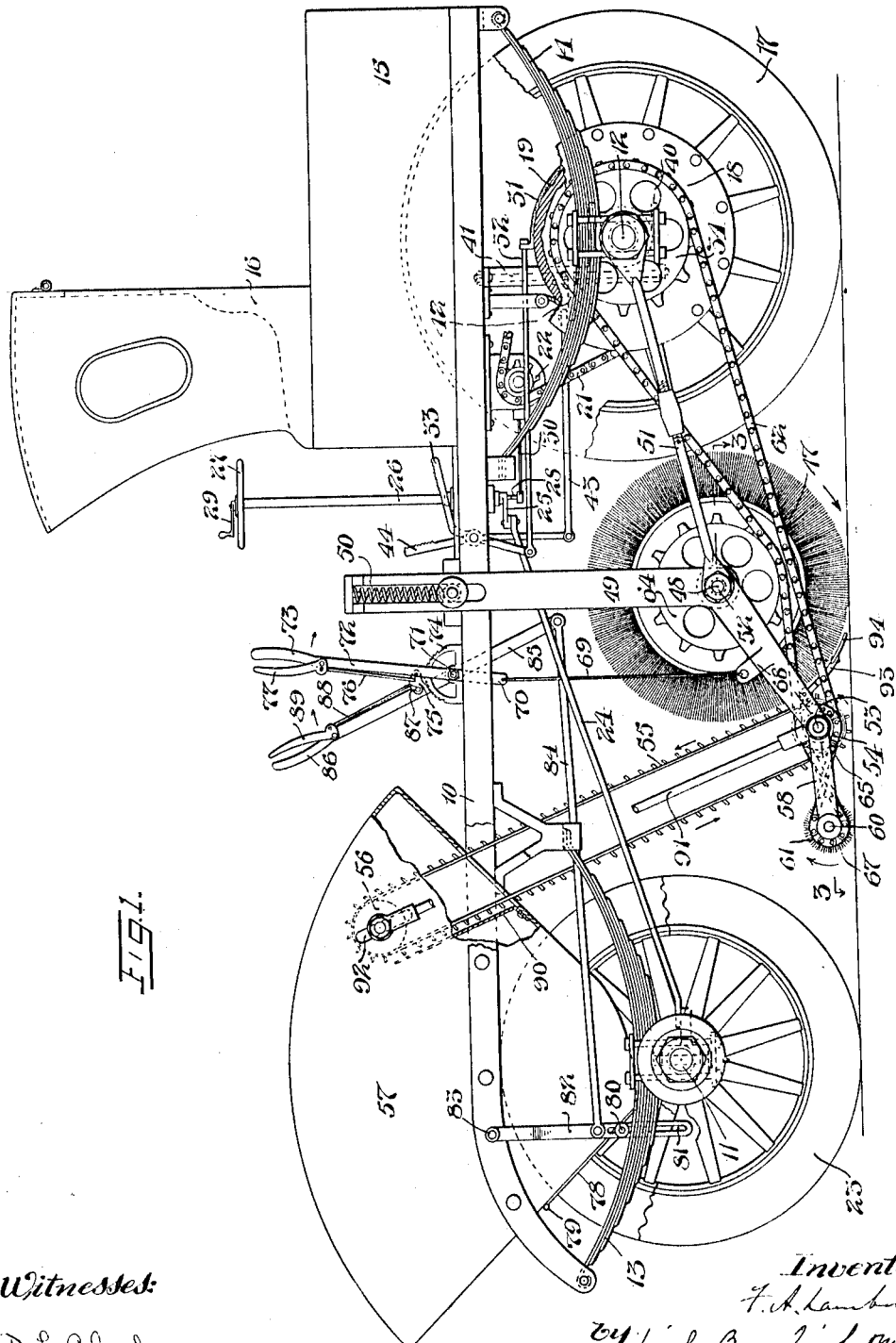

F. A. LAMBERT.
STREET SWEEPER.
APPLICATION FILED NOV. 4, 1913.

1,118,559.

Patented Nov. 24, 1914.
2 SHEETS—SHEET 1.

Witnesses:
D. L. Clark.
E. Batchelder.

Inventor:
F. A. Lambert
by [signature]
Attys.

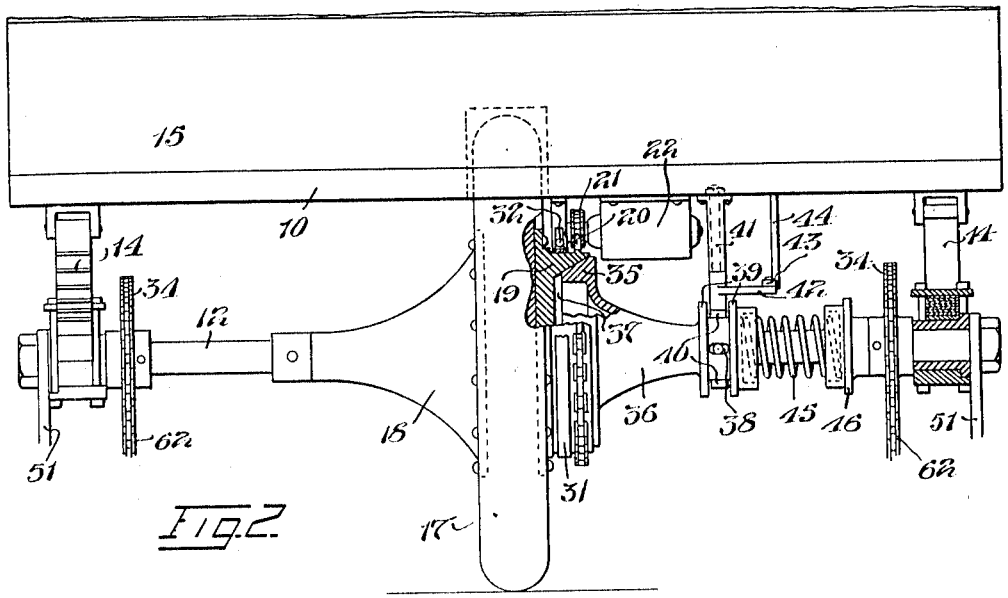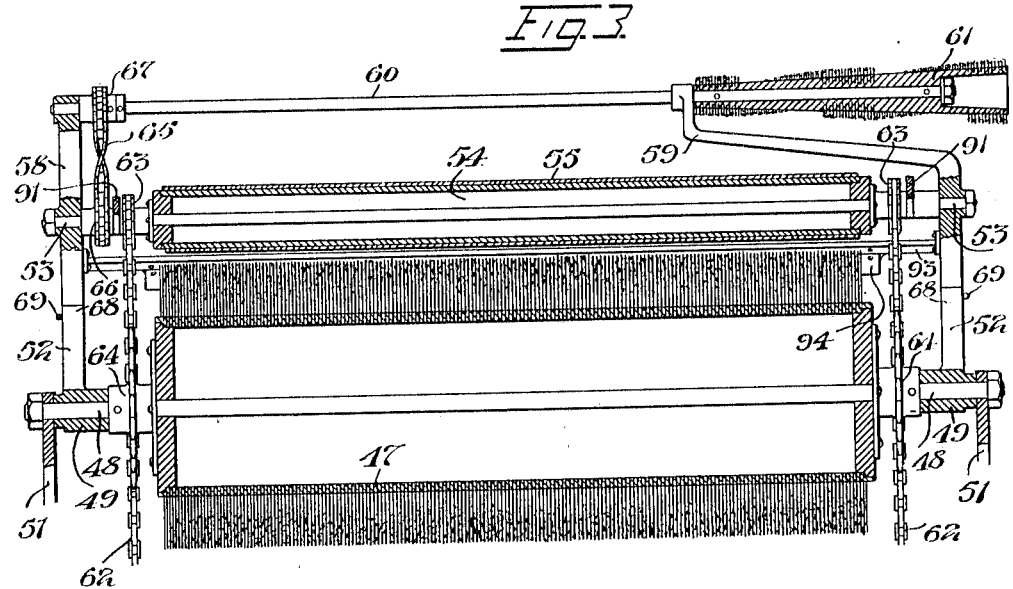

UNITED STATES PATENT OFFICE.

FRED A. LAMBERT, OF LAWRENCE, MASSACHUSETTS.

STREET-SWEEPER.

1,118,559.  Specification of Letters Patent.  Patented Nov. 24, 1914.

Application filed November 4, 1913. Serial No. 799,139.

*To all whom it may concern:*

Be it known that I, FRED A. LAMBERT, a citizen of the United States, and a resident of Lawrence, in the county of Essex and State of Massachusetts, have invented certain new and useful Improvements in Street-Sweepers, of which the following is a specification.

This invention relates to machines for sweeping the streets, and refers particularly to power driven machines.

One of the objects of the invention is to provide an efficient machine of low initial cost and economical in operation, having means whereby the entire control of the machine, including gathering and dumping the sweepings, may be effected by one operator riding on the machine.

A further object is to provide a machine which has no rapidly moving brush to stir up dust, but which will gather the dirt and deposit it in a hopper without scattering it.

To these ends the invention consists in the improvements which I shall now proceed to describe and claim.

Of the accompanying drawings: Figure 1 is a side elevation of a machine embodying my improvements, parts being broken out or in section; Fig. 2 is an elevation, partly in section, of the rear driving axle and some of the parts coöperating therewith; Fig. 3 represents a section on line 3—3 of Fig. 1; Fig. 4 is a detail view of the supplemental or gutter brush.

Similar reference characters indicate the same or similar parts in all of the views.

The main portion of the body or frame of the machine is indicated at 10, said body being supported upon front and rear axles 11, 12, through the medium of suitable springs 13, 14 respectively.

Mounted upon the body is a casing 15 for storage batteries, a seat 16 for the operator, which may have a suitable hood above it, being mounted upon the battery casing.

The machine has but a single rear wheel 17, said wheel being the driving wheel and having a hub 18 loosely mounted upon the rear axle 12. Secured to the other side of the wheel 17 is a ring or drum 19 having an externally smooth periphery for a brake band, and a tapering inner surface, as indicated in Fig. 2, to constitute a clutch member, as hereinafter described. This ring or drum also carries sprocket teeth 20 connected by a sprocket chain 21 with a small sprocket wheel driven by an electric motor 22, the latter having suitable electric connections (not shown) with the source of electrical energy in the casing 15.

Connected to the front axle 11 by swinging connections or yokes such as are common in automobiles, are two wheels 23, said wheels having the customary automobile steering connections with a rod 24, the rear end of said rod being connected to an arm 25 of a steering post 26 having a hand wheel 27 in accessible proximity to the seat 16. The steering post is hollow, as is common in automobile constructions, and within said post is a rod or vertical rockshaft, the lower end of which is indicated at 28 in Fig. 1. The upper end of said rod is provided with a handle 29, and the lower end of the rod is connected by means of a suitable link 20 with any suitable switch to control the motor 22.

A brake band 31 upon the ring or drum 19 has one end rigidly secured to a suitable part of the body, the other end being connected by a rod 32 (Fig. 1) with the lower end of a lever 33, said lever having a foot piece whereby it may be actuated by the operator to tighten the band upon the brake drum.

As indicated in Fig. 2, the axle 12 carries two sprocket wheels 34 which, as hereinafter described, are connected by sprocket chains with the main or sweeping brush drum. A cone clutch member 35 having a hub 36 coöperates with the internal clutch face 37 of the ring or drum 19, said hub 36 having a splined connection with the axle 12, as indicated at 38 in Fig. 2. Said hub 36 has collars or flanges 39 between which a fork 40 of a vertical rockshaft 41 engages, said rockshaft having an arm 42 connected by a link 43 with a lever 44 (Fig. 1) pivoted to the frame and having its upper end in convenient position to be worked by the operator on the seat 16. Suitable locking segments may be employed in connection with the levers 33 and 44. A spring 45 is confined between a collar 46 secured on the axle 12 and the end of the clutch hub 36, said spring having a tendency to keep the clutch members normally in engagement, the operator, by means of the lever 44, shifting the clutch member 35 away from engagement with the clutch face 37 when it is desired to stop the sweeping operation, without stopping the entire machine.

The main brush drum 47, having any suitable brush material, has its shaft or trunnions 48 mounted in a vertically movable frame 49 which is supported by the body 10 through the medium of springs 50 to permit said frame to yield either when the sweeper is passing over irregular surfaces or when it is desired to raise the brush drum as hereinafter described. The frame 49 is connected by adjustable struts 51 with the rear axle 12, and said frame has forwardly projecting arms 52 which support the shaft or trunnions 53 of a roll or drum 54, upon which is mounted an endless conveyer 55, the upper end of said conveyer being supported upon an upper roll or drum 56 which is mounted inside of a hopper 57 that is supported by the body 10.

As shown in Fig. 3, one of the arms 52 has a straight extension 58 and the other has an inwardly projecting extension 59 the forward end of which is offset inwardly so that it stands in front of the main brush 47 and over the path thereof. Mounted in bearings in the forward ends of the extensions 58, 59 is a shaft 60 having a tapering or cone-shaped gutter brush 61. The outer end of the brush 61 extends sufficiently far outside of the path of the brush 47 to gather up gutter dirt. The inner end of the gutter brush is located over the path of the main brush, the formation of the gutter brush being, as hereinafter described, such as to throw the gutter dirt or sweepings forward into the path of the brush 47.

I will now describe the means whereby the brushes and the conveyer are operated. Sprocket chains 62 connect the sprocket wheels 34 on axle 12 with sprocket wheels 63 on shaft 53 of the conveyer, the upper stretches of the chains 62 engaging the under sides of sprocket wheels 64 secured to the shaft 48 of the main brush. Consequently, as the machine moves forwardly, the main brush 47 rotates in the direction of the arrow in Fig. 1 while the conveyer rotates in the direction indicated by arrows in said figure. The speed of revolution of the brush 47 is not rapid, and consequently little or no dust is stirred up. It is fast enough however to force the dirt forward so as to be gathered up by the conveyer 55 and by the latter deposited in the hopper 57.

A crossed sprocket chain or belt 65 connects sprockets or pulleys 66, 67 on the shafts 53, 60, respectively, so as to rotate the brush 61 in the direction of the arrow indicated in Fig. 1.

It is desirable that the frame 49 and the parts supported thereby shall be capable of being lifted away from the surface of the street, so that the machine can be transported conveniently from place to place by its own power without performing any sweeping operation. To this end suitable ears 68 of the arms 52 are connected by links 69 with arms 70 of a rock-shaft 71 mounted on the body 10, said rockshaft having a lever arm 72 in accessible proximity to the seat 16, said lever having a handle 73. A toothed segment 74 is engaged by a catch 75 pivoted to the lever 72 and connected by a link 76 with a tripping grip 77. This structure enables the operator, by grasping the members 73, 77, to rock the shaft 71 and through the links 69 lift the entire frame 49 to such height as may be desirable to prevent contact of the brushes with the surface of the street, release of the members 73, 77 then causing the catch 75 to lock the parts in their raised positions.

In order that the hopper may be dumped or relieved of its contents whenever desired, said hopper is provided with a door 78 hinged at 79 and having secured to it a cross rod 80. The ends of the cross rods engage slots 81 in the arms 82 of a rockshaft 83 mounted in the body 10. One of the arms 82 is connected by a link 84 with a lever 85 pivoted on the rockshaft 71 and having a handle 86, a catch 87, a link 88, and a tripping grip 89. Coöperating with the catch 87 is a toothed segment by the side of and similar to the toothed segment 74.

To prevent the dirt which is deposited in the hopper from escaping through the opening which admits the endless conveyer, I provide a partition or shield 90.

In order that the endless conveyer may not slacken when its lower shaft moves or swings upwardly from the street surface, as hereinbefore explained, I may connect the shaft 53 with the shaft of the upper conveyer roll 56 by means of tie rods 91, the trunnions or shaft of the upper drum 56 being guided in slots 92 formed in suitable parts of the body or brackets connected to said body.

By the employment of but one rear driving wheel, I not only reduce the cost of the machine by dispensing with one of the usual four wheels employed, but I also enable the machine to accommodate itself better to lateral inequalities of the surface being swept. By placing the devices for controlling the motor, the steering, the clutch and the brake and the hopper dumping devices all within reach of a person on the seat 16, the machine is capable of being controlled by one operator not only to sweep but also deliver the dirt from the hopper in any place desired and whenever necessary.

To facilitate the delivery of dirt from the main brush toward the conveyer, I provide a curved plate 93 which is shown in Fig. 1 as supported by the arms 52, said plate preferably having a flexible edge 94 which may consist of a strip of rubber secured to the plate 93. The lower edge of this plate extends nearly to the plane of travel of the sweeper, or, in other words, the street surface, and serves to direct or guide the dirt from the brush and deliver it to the conveyer.

As indicated in Figs. 3 and 4, the brush or bristle material of the cone-shaped brush 61 is spirally arranged, the spiral extending in such direction that as said brush revolves, it will tend to draw the dirt from the gutter close to the curbing, away from the extreme gutter or curbing to position where it will be acted upon by the main brush and delivered to the conveyer. The main reason for constructing the brush 61 in the form of a cone is so that it may conform better to the slope or incline of the surface of the street pavement, which of course is deeper adjacent the curbing than elsewhere.

Having described my invention, I claim:

1. A street sweeper comprising a body, a motor-driven rear axle, a brush and drum-carrying frame mounted to move vertically on the body in advance of the rear axle, means for vertically adjusting said frame, a brush and a lower conveyer drum journaled side by side in bearings on said frame, an upper conveyer drum above the body, an endless conveyer mounted on said drums, connections between the said upper drum and the frame whereby the upper drum is caused to move vertically with the frame and with the lower drum to maintain the endless conveyer under tension, driving connections between the lower drum, the brush, and the rear axle organized to rotate the brush and drum simultaneously in opposite directions, and means movable with the frame for supporting it against backward displacement.

2. A street sweeper comprising a body, a motor-driven rear axle, a brush and drum-carrying frame mounted to move vertically on the body in advance of the rear axle, means for vertically adjusting said frame, a brush and a lower conveyer drum journaled side by side in bearings on said frame, an upper conveyer drum above the body, an endless conveyer mounted on said drums, connections between the said upper drum and the frame whereby the upper drum is caused to move vertically with the frame and with the lower drum to maintain the endless conveyer under tension, driving connections between the lower drum, the brush, and the rear axle organized to rotate the brush and drum simultaneously in opposite directions, and vertically swinging struts pivoted to the rear axle and to the shaft of the brush to support the frame against backward displacement.

3. A street sweeper comprising a body, a motor-driven rear axle, a brush and drum-carrying frame mounted to move vertically on the body in advance of the rear axle, means for vertically adjusting said frame, a brush and a lower conveyer drum journaled side by side in bearings on said frame, an upper conveyer drum above the body, an endless conveyer mounted on said drums, connections between the said upper drum and the frame whereby the upper drum is caused to move vertically with the frame and with the lower drum to maintain the endless conveyer under tension, the rear axle, the brush and the lower drum being provided with sprocket wheels, sprocket chains engaged with the wheels on the said axle and drum to rotate the drum in the same direction as the axle, and with the wheels on the brush to rotate the latter in the opposite direction, and means for supporting the frame against backward displacement.

4. A street sweeper comprising a body, a motor-driven rear axle having sprocket wheels, a frame mounted to slide vertically on the body in advance of the rear axle and having forwardly projecting arms, a brush journaled in said frame and having sprocket wheels, a lower conveyer drum journaled in said arms and having sprocket wheels, chains engaged with the sprocket wheels on the rear axle and with the sprocket wheels on the brush and conveyer drum to simultaneously rotate said brush and drum in opposite directions, means for vertically adjusting the frame, an upper conveyer drum above the body, tie rods connecting the upper and lower conveyer drums, an endless conveyer engaged with said drums, means for vertically adjusting the frame, the brush and the conveyer, and swinging struts connecting the rear axle with the frame.

5. A street sweeper comprising a body, a motor-driven rear axle having sprocket wheels, a frame mounted to slide vertically on the body and having forwardly projecting arms, a main brush journaled in said frame and having sprocket wheels, a lower conveyer drum journaled in said arms and having sprocket wheels, chains connecting the sprocket wheels on the rear axle, the main brush and the lower drum to simultaneously rotate said brush and drum in opposite directions, an endless conveyer and an upper conveyer drum coöperating with the lower drum, said arms being provided with forwardly projecting extensions, one of which has its forward end offset inwardly and located in front of the main brush, and over the path thereof, a brush shaft journaled in the forward ends of said extensions and having a laterally projecting gutter brush, one end of which is outside and the other end inside the path of the main brush, said gutter brush being formed to move its sweepings into the path of the main brush, and driving connections between the gutter brush shaft and the lower conveyer drum.

In testimony whereof I have affixed my signature, in presence of two witnesses.

FRED A. LAMBERT.

Witnesses:
 A. W. HARRISON,
 D. L. CLARK.

Copies of this patent may be obtained for five cents each, by addressing the "Commissioner of Patents, Washington, D. C."